US008717880B2

(12) United States Patent
Agulnik et al.

(10) Patent No.: US 8,717,880 B2
(45) Date of Patent: May 6, 2014

(54) DETECTING ABNORMAL BEARER TERMINATION AND DYNAMICALLY RESTORING FLOWS UTILIZING AN ALTERNATIVE BEARER (75) Inventors: Anatoly Agulnik, Deerfield, IL (US); James A. Marocchi, Winfield, IL (US); Trent J. Miller, West Chicago, IL (US)

(73) Assignee: Motorola Solutions, Inc., Schaumburg, IL (US)

(*) Notice: Subject to any disclaimer, the term of this patent is extended or adjusted under 35 U.S.C. 154(b) by 269 days.

(21) Appl. No.: 13/193,262

(22) Filed: Jul. 28, 2011

(65) Prior Publication Data

US 2013/0028075 A1 Jan. 31, 2013

(51) Int. Cl.
*H04W 40/12* (2009.01)
*H04W 24/00* (2009.01)
*H04W 72/08* (2009.01)
*H04W 28/18* (2009.01)

(52) U.S. Cl.
USPC ......... 370/225; 370/216; 370/218; 455/452.1

(58) Field of Classification Search
USPC ......... 370/216–218, 225, 328, 329, 330, 331, 370/332, 334; 455/432.1, 436, 444, 445, 455/451, 452.1, 452.2
See application file for complete search history.

(56) References Cited

U.S. PATENT DOCUMENTS

| 7,558,240 | B2* | 7/2009 | Chen et al. ............ 370/338 |
| 7,818,450 | B2 | 10/2010 | Chen et al. |
| 8,064,403 | B2* | 11/2011 | Zhao et al. ............ 370/331 |
| 8,081,562 | B2* | 12/2011 | Charpentier et al. ...... 370/216 |
| 8,300,575 | B2* | 10/2012 | Willars ................ 370/328 |
| 2005/0064821 | A1 | 3/2005 | Hedberg et al. |
| 2007/0155376 | A1 | 7/2007 | Payyappilly |
| 2008/0165964 | A1 | 7/2008 | Adam et al. |
| 2009/0252132 | A1* | 10/2009 | Song et al. ............ 370/338 |
| 2009/0275286 | A1 | 11/2009 | Popovich et al. |
| 2010/0240385 | A1* | 9/2010 | Lohr et al. ............ 455/452.2 |
| 2011/0111758 | A1* | 5/2011 | Liu et al. ............. 455/435.2 |

(Continued)

OTHER PUBLICATIONS

Rosen, E., and Rekhter, Y., "BGP/MPLS IP Virtual Private Networks (VPNs)," RFC 4364, Network Working Group, Feb. 2006.

(Continued)

*Primary Examiner* — Ahmed Elallam
(74) *Attorney, Agent, or Firm* — Barbara R. Doutre; Steven A. May (57) ABSTRACT

An abnormal termination of a dedicated bearer (e.g., a lost bearer) (134) or a change in bearer characteristics that renders the dedicated bearer unusable of a mobile device (114) can be detected. The lost bearer (128) is a bearer that is not a default bearer (132) within a communication network that includes one or more lost communication flows (135). At least one radio access network (RAN) capable of communicating with the mobile device (114) can be determined, where the at least one RAN is not one used for the dedicated bearer (134) that was abnormally terminated. At least one alternative bearer (150) can be detected or established at the at least one RAN. Each lost communication flow (138) can be automatically and dynamically routed to the at least one alternative bearer (150). The routing of the lost communication flows (138) can occur without interrupting communications.

16 Claims, 6 Drawing Sheets

(56) References Cited

U.S. PATENT DOCUMENTS

| | | | |
|---|---|---|---|
| 2011/0255409 A1* | 10/2011 | Aramoto et al. | 370/236 |
| 2011/0310850 A1 | 12/2011 | Klingenbrunn | |
| 2012/0026880 A1* | 2/2012 | Miller et al. | 370/235 |
| 2012/0092992 A1* | 4/2012 | Pappas et al. | 370/235 |
| 2012/0099416 A1* | 4/2012 | Bekiares et al. | 370/216 |
| 2012/0144226 A1* | 6/2012 | Yang et al. | 714/2 |
| 2012/0207011 A1* | 8/2012 | Franklin et al. | 370/216 |
| 2013/0016696 A1* | 1/2013 | Adjakple et al. | 370/331 |
| 2013/0136025 A1* | 5/2013 | Li et al. | 370/252 |

OTHER PUBLICATIONS

International Search Report and Written Opinion for counterpart International Patent Application No. PCT/US2012/046568 mailed on Jul. 13, 2012.

* cited by examiner

DETECTING ABNORMAL BEARER TERMINATION AND DYNAMICALLY RESTORING FLOWS UTILIZING AN ALTERNATIVE BEARER

FIELD OF THE INVENTION

The present invention relates to the field of network communications and, more particularly, to detecting abnormal bearer termination and dynamically restoring flows utilizing an alternative bearer.

BACKGROUND

A radio access network (RAN) is a part of a mobile communication system that implements radio access technology. That is, a RAN is a portion of a communication network that connects mobile devices to a core network (CN). One or more bearers (e.g., discrete communication connections) can be established between a RAN and mobile device. One or more distinct flows of information can be conveyed over each bearer. Some mobile devices are able to concurrently connect to multiple RANs at the same time.

At present in a 3rd Generation Partnership Project (3GPP) network, connectivity between a mobile device and a RAN is enabled by at least a default bearer. When this bearer (or any other bearer) is lost, the mobile device is no longer able to communicate with the core network over the lost bearer. Conventional 3GPP networks effectively monitor the dedicated bearer for a loss of coverage (or performs this function through some mechanism: for example, LTE monitors a Layer 2 (L2) state to determine attachment), which if it occurs an assumption is made that the mobile device experiences an RF loss. The network may attempt to "pass-off" all the bearers established between the mobile device and the RAN to an alternative network in response. Moving the bearers of the mobile device from one RAN to another is an all-or-nothing process. Even if one bearer (assuming multiple bearers connect a RAN and mobile device and assuming a default bearer is lost) is operating fine, all communications between the mobile device and RAN are moved. It should be appreciated that a mobile device can be concurrently connected to multiple RANs at a time, and that only bearers connecting the mobile device to a single RAN (the one where the default bearer was lost) are affected by the "pass-off".

SUMMARY

One embodiment of the disclosure detects an abnormal termination of a dedicated bearer, referred to as a lost bearer. The lost bearer is a bearer that is not a default bearer within a communication network. The lost bearer includes one or more lost communication flows, wherein each of the lost communication flows is an information exchange between a network component and a mobile device. Bearer properties of the dedicated bearer that was terminated can be determined. At least one radio access network (RAN) capable of communicating with the mobile device can be determined, wherein the at least one RAN is not one used for the dedicated bearer that was abnormally terminated. At least one alternative bearer can be detected or established at the at least one RAN. The alternative bearer can have bearer properties ensuring no loss of quality as defined by the bearer properties of the lost bearer. Each of the lost communication flows can be automatically and dynamically moved to the at least one alternative bearer. Moved lost communication flows can be referred to as restored flows. A one-to-one correspondence can exist between lost flows and restored flows. The moving of the lost communication flows to the restored flows can occur without interrupting communications and in a manner that requires no manual actions to be taken by a user of the mobile device.

One embodiment of the disclosure is for a system that includes a node for detecting a limited quality of service (QoS) capability within a Long Term Evolution (LTE) network. The limited QoS can result in an unexpected termination of a dedicated bearer within the LTE or a change in bearer characteristics (such as lowered bandwidth or increased bearer packet latency) that renders the bearer unusable. The system can further include a device bearer application programming interface (API) configured to communicate a change of radio access network parameters associated with re-establishing a communication flow linked to the dedicated bearer. The radio access network parameters can be associated with an alternative radio access network.

DETAILED DESCRIPTION

Detection of lost communications between a radio access network (RAN) and mobile device is currently determined solely using the default bearer. When communications involving another bearer (e.g., a dedicated bearer, which is not the default bearer) are lost, this loss is not detected. Attempts to send data over the lost bearer (to/from the mobile device) are unsuccessfully attempted and no corrective adjustments are made by a traditional system. This problem was noticed by the innovators during the course of developing the solution detailed herein.

There are many reasons, other than being outside a communication range, that a bearer can be lost. For example, a bearer may be pre-empted by a higher priority request. This type of pre-emption can be common at an accident scene or at a disaster scene, where many mobile device carrying responders are often present, which may overload a capacity of a particular communication cell. Pre-emption of existing bearers is becoming increasingly problematic as responders are using more advanced communication technology devices, such as video streaming, Web connected devices, two-way audio, and the like, where video communications consume substantially greater bandwidth compared to audio content. These problems will continue to escalate.

In accordance with the various embodiments, a bearer associated with a primary communication network can be abnormally terminated; the termination can be detected and can trigger one or more restoration actions. Upon detection, an appropriate alternative radio access network (RAN) can be selected for providing communication for the mobile device. Quality of service attributes associated with the dedicated bearer can be determined which can be used in negotiation of communication restoration. In one instance, a new bearer can be established within the alternative RAN. In another instance, existing bearers within the alternative RAN can be utilized to restore communication flows associated with the dedicated bearer.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
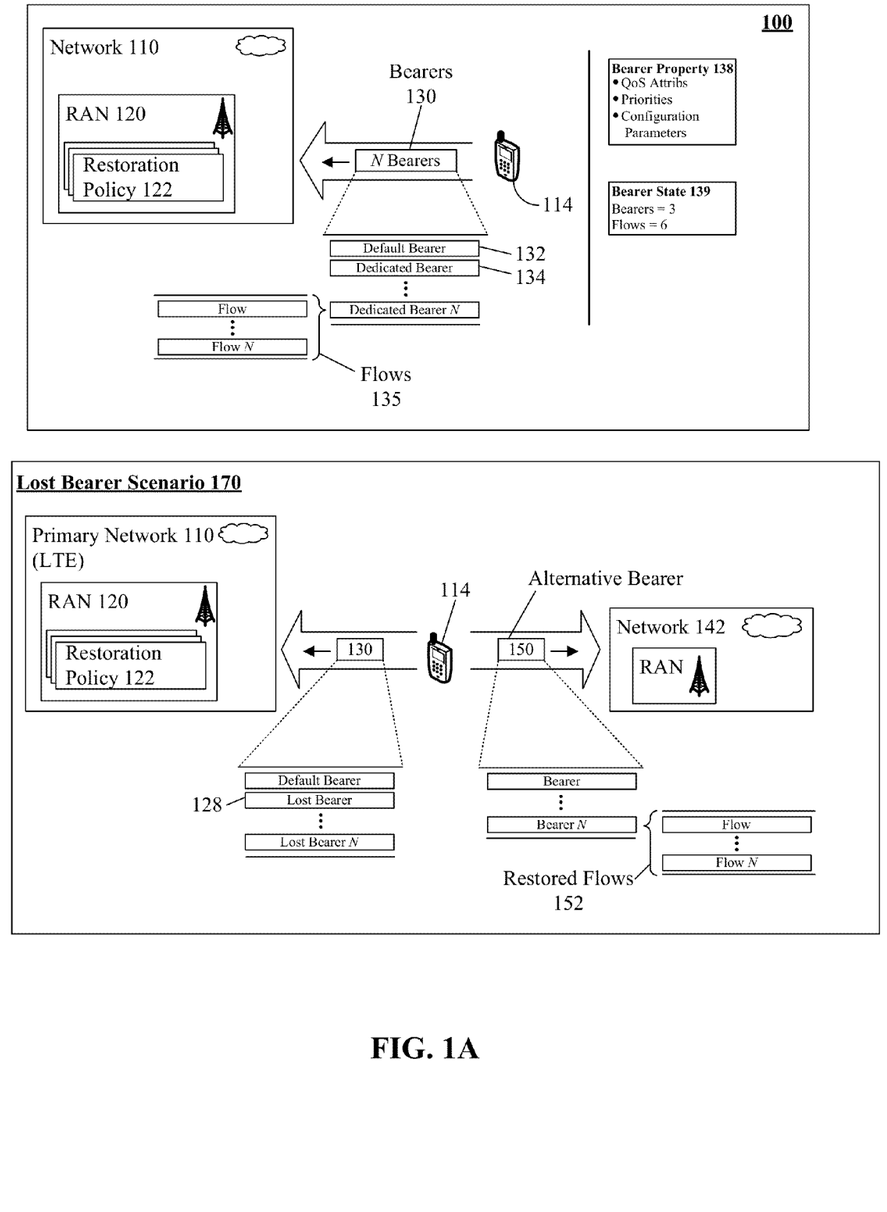
FIG. 1A is a block diagram illustrating a scenario for detecting abnormal bearer termination and dynamically restoring flows utilizing alternative radio access networks (RAN) in accordance with an embodiment of the inventive arrangements disclosed herein.

FIG. 1A is a block diagram illustrating a scenario 100, 170 for detecting abnormal bearer termination and dynamically restoring flows utilizing alternative radio access networks (RAN) in accordance with an embodiment of the inventive arrangements disclosed herein. Specifically, mobile device 114 can use a set of bearers 130 comprising a default bearer 132 and one or more dedicated bearers 134 to communicate with a network 110. One or more communication flows 135 can be conveyed within each bearer 130. A RAN 120 of network 110 can detect an abnormal termination of one or more bearers 130, which triggers a restoration action in accordance with a defined restoration policy 122. More specifically, characteristics (e.g., bearer properties 138 and bearer state 139 information) of a lost bearer 128 can be determined.

An alternative bearer 150 can be determined for handling the communications or flows of the lost bearer(s) 128. In one embodiment, the alternative bearer 150 can be a new bearer able to handle flows (e.g., the restored flows 152) of the lost bearer 128. In another embodiment, the alternative bearer 150 can be a set of one or more pre-existing bearers to which one or more additional flows (e.g., the restored flows 152) are added. The establishment of the alternative bearer 150 and/or restored flows 152 can dynamically and automatically occur without user (of device 114) awareness. Additionally, the alternative bearer 150 can have bearer properties that are compatible with those of the lost bearer 128.

To elaborate, in scenario 100, mobile device 114 (e.g., mobile phone) can communicate with a primary network (e.g., Long Term Evolution or LTE network). The mobile device 114 can utilize network components (e.g., LTE Evolved Packet System) to communicate with one or more devices and/or software elements (e.g., applications) within and/or communicatively linked to the network 110. The network 110 can be connected to a communication backbone.

As used herein, bearers 130 can be a discrete connection established by a RAN 120 and/or mobile device 114. Each bearer 130 can have a set of characteristic bearer properties 138, which can vary from bearer-to-bearer. For example, a bearer 130 in one embodiment can be an evolved packet system (EPS) bearer. A default bearer 132 can be a bearer created by default upon initial connection of the mobile device 114 to primary network 110. Dedicated bearer 134 (0 . . . N) can include any additional bearers which can be created during the course of communication between the mobile device 114 and network 110. One or more dedicated bearers 134 can be associated with service specific signaling.

Bearer properties 138 can include, but are not limited to, Quality of Service (QoS) attributes, priorities, configuration parameters, and the like. QoS attributes can include a QoS class identifier (QCI), allocation and retention priority (ARP), guaranteed bit rate (GBR), aggregate maximum bit rate, latency, and packet loss rate. Bearer properties 138 can affect the performance of a bearer 130 and/or flows 135 within the bearers. The bearer state 139 which can specify the quantity of active bearers 130 and/or flows 135 between mobile device and a RAN 120. For example, bearers 130 can include three bearers (e.g., one default bearer and two dedicated bearers) and six communication flows.

Communication flows 135 can represent one or more information exchanges between mobile device 114 and network 110. Flows 135 can include one or more protocols such as Transport Control Protocol (TCP), Internet Protocol (IP), and the like. Flows 135 can facilitate communication between client-side resources and application layer entities (e.g., applications). For example, flow 135 can be a Voice over Internet Protocol (VoIP) communication flow.

In lost bearer scenario 170, flows 135 from a lost bearer 128 can be dynamically restored as restored flows 152 of one or more alternative bearers 150. The restored flows 152 can be appropriately routed to application layer resources. In one instance, restoration policy 122 can be associated with a policy charging and rules function (PCRF) element. In this instance, the PCRF can provide enhanced capabilities over traditional PCRFs enabling bearer and/or flow restoration over multiple alternative radio access networks, such as network 142. For example, the PCRF can execute a policy pull action to detect and restore lost bearer 128.

Drawings presented herein are for illustrative purposes only and should not be construed to limit the invention in any regard. Network 110, 142 components can include, but is not limited to, packet data network gateway (PGW), transport equipment, and the like. It should be appreciated that network 110, 142 can include radio access network utilizing different technologies.

In one embodiment, bearer 130 replacement determination can be performed in accordance with the restoration policy 122 by a Public Safety Interoperability Gateway (PSIG), applications, and/or quality of service broker (QoB). In one embodiment, bearer 130 restoration on alternative RANs (e.g., network 142) can be performed via Rx, S9, Rx++, and the like.

Figure 1B:
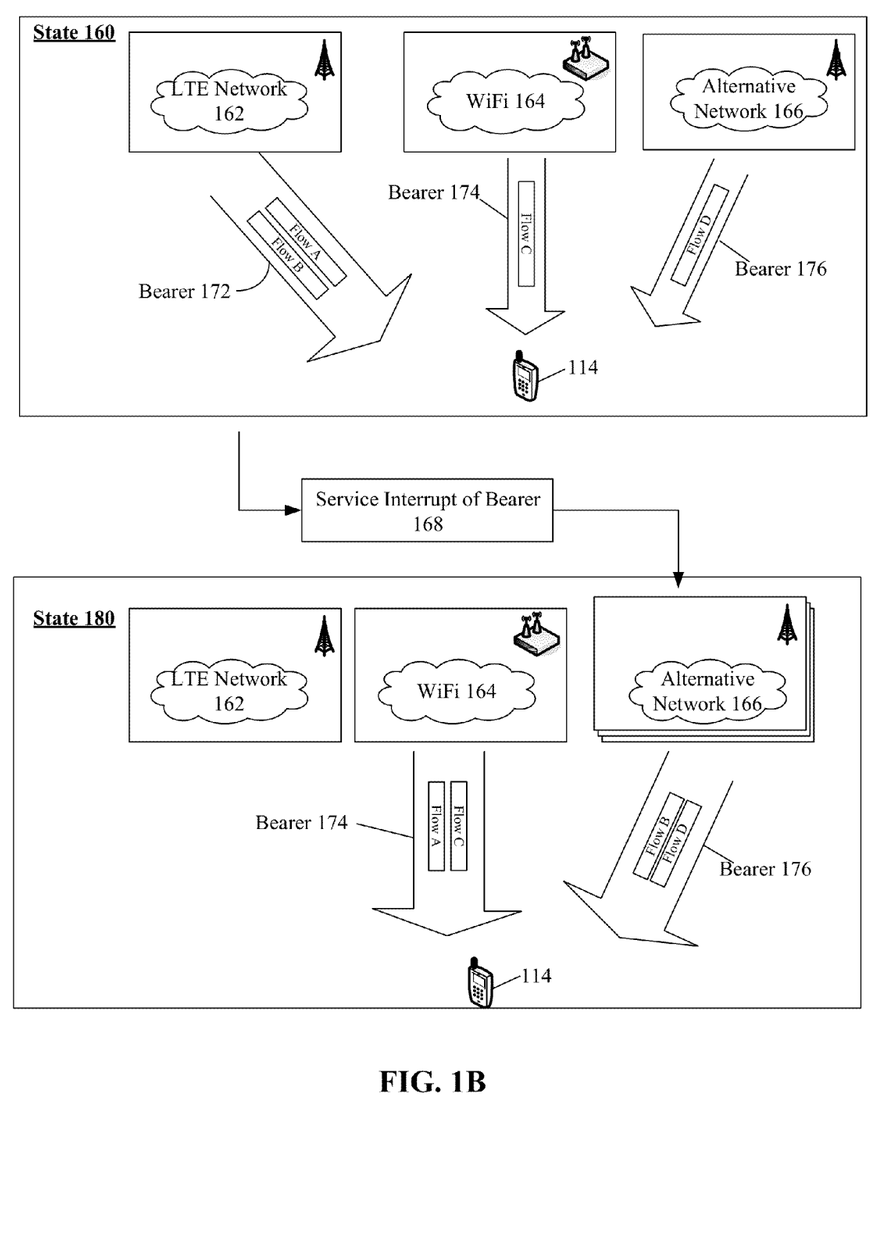
FIG. 1B is a diagram illustrating a scenario for dynamically restoring flows responsive to an abnormally terminated bearer in accordance with an embodiment of the inventive arrangements disclosed herein.

FIG. 1B is a diagram illustrating a scenario for dynamically restoring flows responsive to an abnormally terminated bearer in accordance with an embodiment of the inventive arrangements disclosed herein. In state 160 of FIG. 1B, mobile device 114 can concurrently communicate with a set of networks 162, 164, 166 via a set of bearers 172, 174, 176. Each bearer 172, 174, 176 can include at least one communication flow (e.g., Flow A, B, C, D). Upon detection of service interrupt of bearer 172, alternative bearers can be utilized to replace the terminated bearer 172 and re-establish or restore communication flows (Flow A and Flow B). The alternative bearers that handle the restored flows include existing bearers 174, 176, as shown by state 180.

It should be understood that Flow A and Flow B can be restored within bearers 174, 176 in a manner to ensure that communication flow properties are maintained. In one embodiment, at least a minimum quality of Flow A and Flow B is ensured by QoS properties of the bearers 174, 176. Hence, each flow (Flow A, B) can be independently restored using bearers 174, 176 which can support flow requirements.

In one instance, a mobile virtual private network (MVPN) can be commanded to switch communication flows (Flow A, Flow B) between state 160 and 180. In one embodiment, multiple application steering configurations can be pre-configured to change data packet markings within the PSIG to force the MVPN to switch flows to a new bearer.

Figure 2:
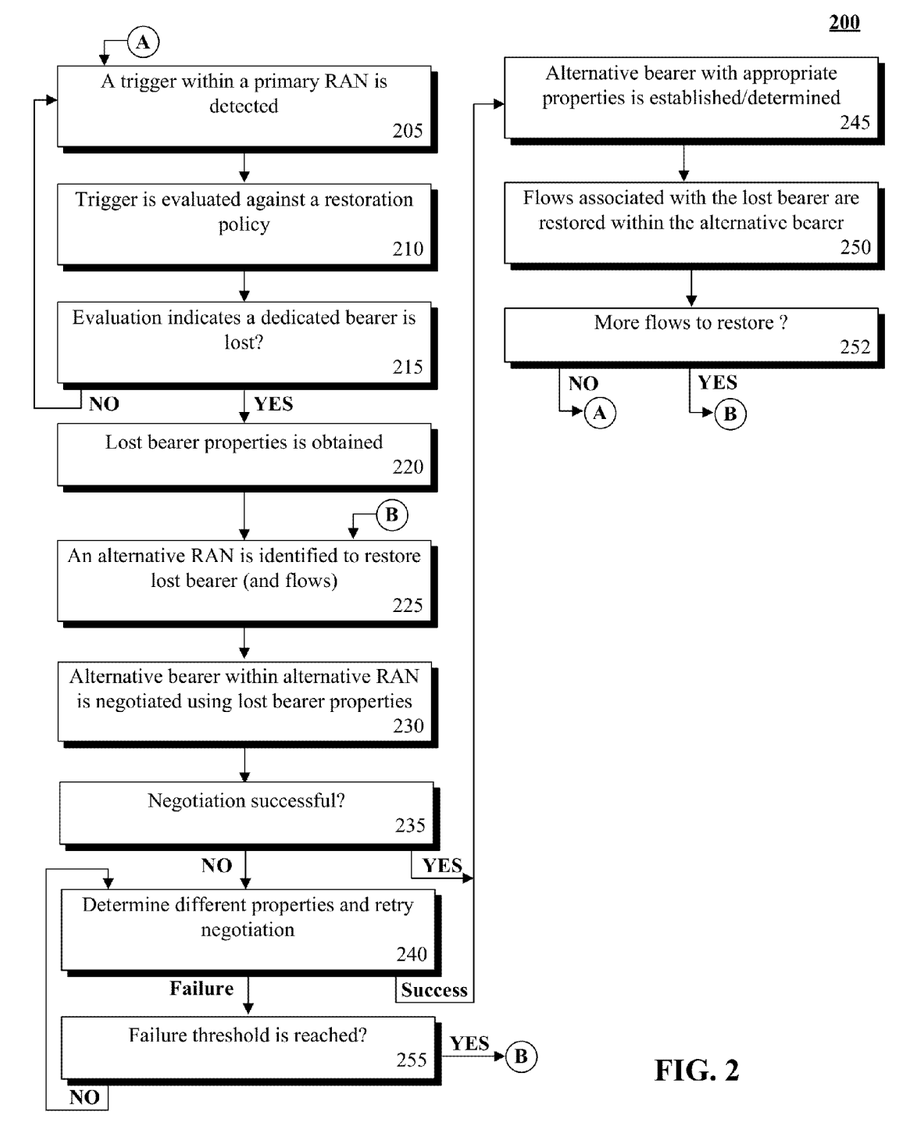
FIG. 2 shows a process for detecting abnormal bearer termination and dynamically restoring flows in accordance with an embodiment of the inventive arrangements disclosed herein.

FIG. 2 shows a process 200 for detecting abnormal bearer termination and dynamically restoring flows in accordance with an embodiment of the inventive arrangements disclosed herein. In process 200, a dedicated bearer within a primary radio access network (RAN) can be unexpectedly terminated. The dedicated bearer can be a non-default bearer. The termination can be detected via one or more triggers established in accordance with a restoration policy. The restoration policy can be utilized to restore lost flows of a lost bearer. The lost flows can be restored within an alternative radio network by creating an alternative bearer with bearer properties matching requirements of the lost flows. That is, terminated bearer can be restored within a different network with approximately the same properties (e.g., quality of service properties) or higher.

In step 205, a trigger within a radio access network (RAN) can be detected. The trigger can include one or more traditional and/or proprietary network events. For instance, a trigger can include a Gx event from a Long Term Evolution (LTE) core indicating that a dedicated bearer is lost/pre-empted. In step 210, the trigger can be evaluated against a restoration policy. The restoration policy can include trigger values and/or restoration actions for triggers. In step 215, if the evaluation indicates a dedicated bearer is lost/terminated, the process can continue to step 220, else return to step 205. The evaluation can prompt bearer recover actions which can be trigger specific. For example, a bearer can be recovered on a specified alternative network and quality of service (QoS) settings based on the time of day the bearer is lost. In step 220, the lost bearer properties can be obtained. Properties can be obtained from previously established settings, user specific settings, and the like.

In step 225, an alternative RAN can be identified to restore the lost bearer and/or associated flows. The RAN can be identified and/or selected based on proximity to the mobile device, restoration policy settings, and the like.

In step 230, an alternative bearer within the alternative RAN can be negotiated using lost bearer properties. For example, an alternative bearer can be selected/created restored based on radio access technology in priority order. The alternative bearer can be an existing bearer on the alternative RAN, which is to handle one or more additional flows and/or the alternative bearer can be a newly established on the alternative RAN. In step 235, if the negotiation is successful, the process can proceed to step 245, else continue to step 240.

In step 240, different bearer properties can be determined and negotiation of bearer establishment can be retried. If negotiation is successful the method can continue to step 245, else proceed to step 255. In step 255, if the failure threshold is reached, the process can continue to step 225, else return to step 240. The failure threshold can be an automatically and/or manually established value. For example, the failure threshold can be set to three retries before selecting a different RAN is performed.

In step 245, the alternative bearer can be established with appropriate properties based on the negotiating step 240. In step 250, flows associated with the lost bearer can be restored within the alternative bearer. In step 250, if more lost flows exist that need to be restored, the process can continue to step 225. Else the process can return to step 205, which can cause the process repeat continuously permitting real-time or near real-time bearer restoration within a primary RAN.

Figure 3:
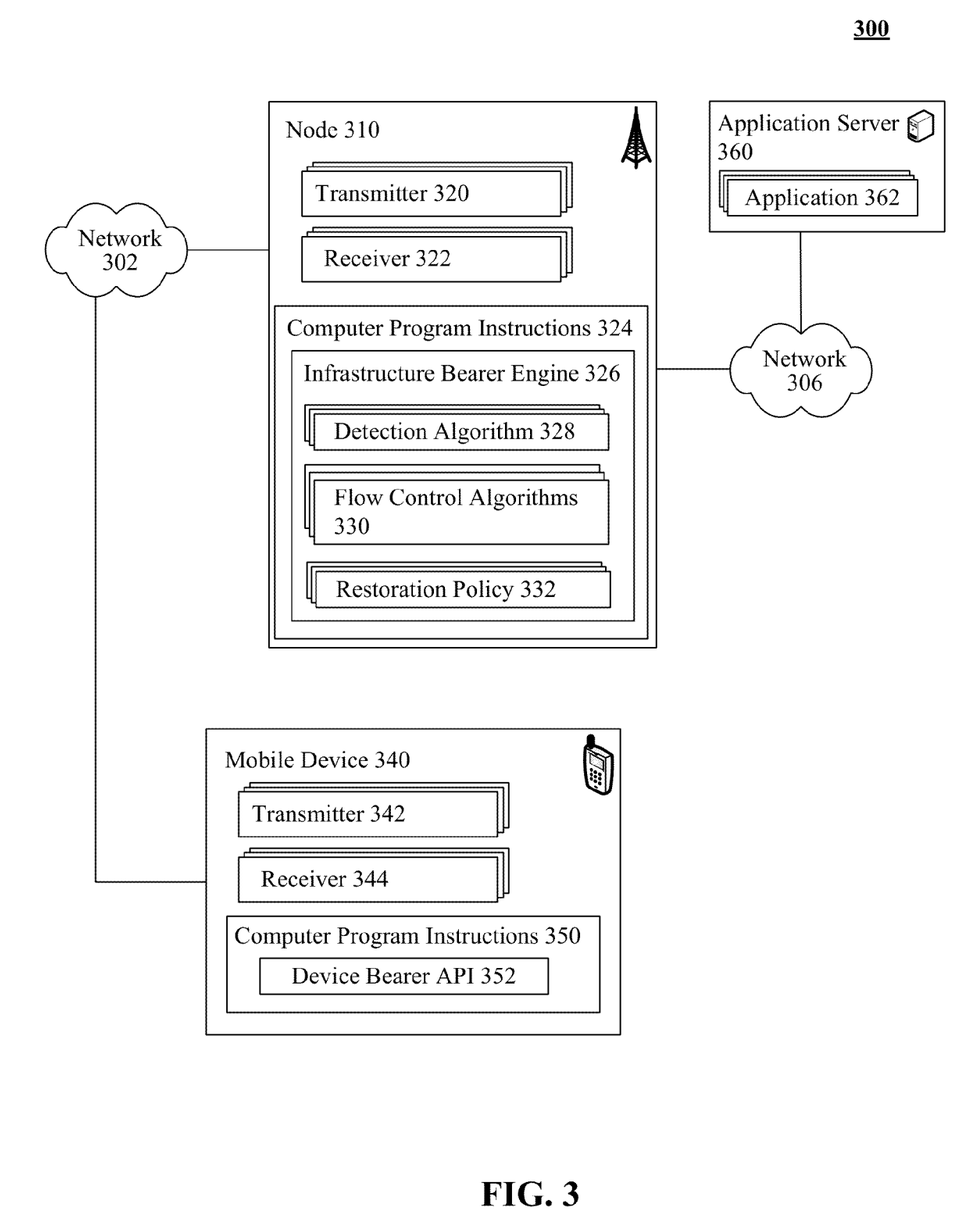
FIG. 3 is a diagram illustrating a system for detecting abnormal bearer termination and dynamically restoring flows in accordance with an embodiment of the inventive arrangements disclosed herein.

FIG. 3 is a diagram illustrating a system 300 for detecting abnormal bearer termination and dynamically restoring flows in accordance with an embodiment of the inventive arrangements disclosed herein. In system 300, mobile device 340 can communicate with one or more applications 362 executing within an application server 360. Communication can be facilitated by bearers (e.g., dedicated bearers and a default bearer) which can be dynamically moved from a primary network to an alternative network utilizing engine 326.

Node 310 can include a set of equipment that facilitates wireless communication (over network 302). In various embodiments, the node 310 can include LTE Evolved Packet System (EPS). In one embodiment, the node 310 can be guaranteed to follow 3rd Generation Partnership Project (3GPP) standards. Node 310 may or may not be in compliance with 4G standards.

The node 310 can include one or more transmitters 320 and one or more receivers 322. Each transmitter 320 can transmit information from the node 310 to the network 302 and/or from the node 310 to network 306. Each receiver 322 can receive information from network 302 and/or 306.

The node 310 can include a set of computer program instructions 324 that are stored on at least one storage medium and that are able to be executed by one or more processors. The computer program instructions 324 can be implemented within software, firmware, or printed circuitry. Sets of computer program instructions 324 can implement an infrastructure bearer engine 326. The engine 326 can facilitate detection of abnormal dedicated bearer termination and bearer restoration within external radio access networks.

The engine 326 can perform detection actions, policy control actions, restoration actions, mobile device coordination actions, and the like. Engine 326 can include, but is not limited to, detection algorithm 328, flow control algorithms 330, restoration policy 332, and the like. In one embodiment, the engine can permit application (e.g., application 362) directed bearer rescue/transition.

Detection algorithm 328 can be one or more algorithms for sensing the unexpected termination of a dedicated bearer. For example, algorithm 328 can detect limited QoS capacity on an LTE and convey a notification that a bearer has been pre-empted. Algorithm 328 can include any traditional and/or proprietary algorithms. In one instance, algorithm 328 can be a functionality of a Public Safety Interoperability Gateway (PSIG) Application Programming Interface (API).

Flow control algorithms 330 can be a set of algorithms for re-establishing and/or transitioning flows from a lost bearer to an existing bearer and/or a recently created dedicated bearer within an alternative radio access network. In one embodiment, algorithms 330 can conform to an infrastructure bearer control API. For example, algorithms 330 can be associated with a traffic flow template (TFT) functionality.

Restoration policy 332 can be one or more policy rules for detecting and restoring dedicated bearers. Policy 332 can include rescue actions which can be dynamically customized to enable optimum bearer resurrection. Rescue actions can include recovering a bearer based on a static configuration within the policy decision function, restoring bearer based on access network load/congestion, restoration of a bearer based on user priority (e.g., commander vs. street officer), and the like.

The network 302 can be used convey digitally encoded information wirelessly between mobile devices. In various embodiments, network 302 can conform to a variety of wireless communication technologies, such as Global System for Mobile Communications (GSM), Code division multiple access (CDMA), Wireless local loop (WLL), a wide area network (WAN), WiFi (any of the IEEE 802.11 family of standards), WiMAX (Worldwide Interoperability for Microwave Access), etc. In one embodiment, the network 302 can be 3GPP compliant, such as a UMTS or LTE network.

Network 306 can represent a packet switched network. Network 306 can conform to the internet protocol (IP) set of protocols that include a Transmission Control Protocol (TCP) and the Internet Protocol. Network 306 can be public or private. For example network 306 can represent the public internet, a corporate intranet, a virtual private network (VPN), and the like. Data and/or voice (via a Voice over IP) can be conveyed over network 306.

UE 340 can include at least one of a wireless transmitter 342 and wireless receiver 344, which allows the mobile device 340 to connect to wireless network 302. Additional (and optional) receivers and/or transmitters can be included in mobile device 340.

The mobile device 340 can include one or more processor and one or more memory components. The set of one or more processors can execute computer program instructions 350 of the mobile device 340. These instructions 350 can represent logic embedded in semiconductor, firmware embedded instructions, and/or software stored on a storage medium of mobile device 340, such as memory. In one embodiment, mobile device 340 can include device bearer API 352 which can cooperate with network elements to recover terminated bearers.

Figure 4:
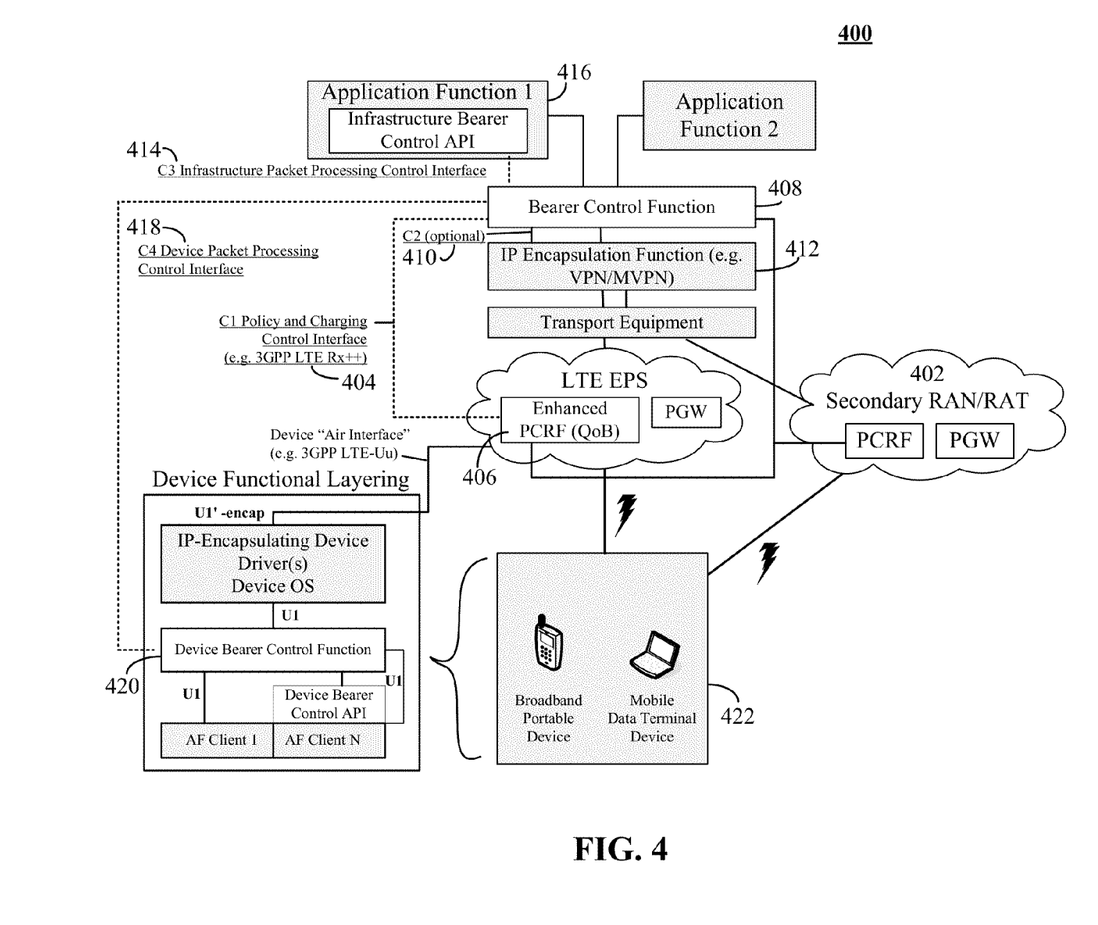
FIG. 4 is a schematic diagram illustrating an embodiment for detecting abnormal bearer termination and dynamically restoring flows in accordance with an embodiment of the inventive arrangements disclosed herein.

FIG. 4 is a schematic diagram illustrating an embodiment for detecting abnormal bearer termination and dynamically restoring flows in accordance with an embodiment of the inventive arrangements disclosed herein.

In system 400, novel control interfaces can be established permitting abnormal bearer termination and restoration within an alternative network (e.g., secondary RAT 402). System 400 can include a C1, C2, C3, and C4 interface for enabling the functionality described herein. C1 interface can be a policy and charging control interface 404 (e.g., 3GPP LTE R++) communicatively linking an enhanced PCRF 406 and a bearer control function 408. C2 can be an optional interface 410 for linking a bearer control function 408 and an IP encapsulation functionality 412 (e.g., VPN/MVPN). C3 can be an infrastructure packet processing control interface 414 tying an application function 416 (e.g., infrastructure bearer control API) with the bearer control function 408. C4 can be a device packet processing and control interface 418 linking a client 420 within a mobile device 422 (e.g., broadband portable device) and a bearer control function 408.

Figure 5:
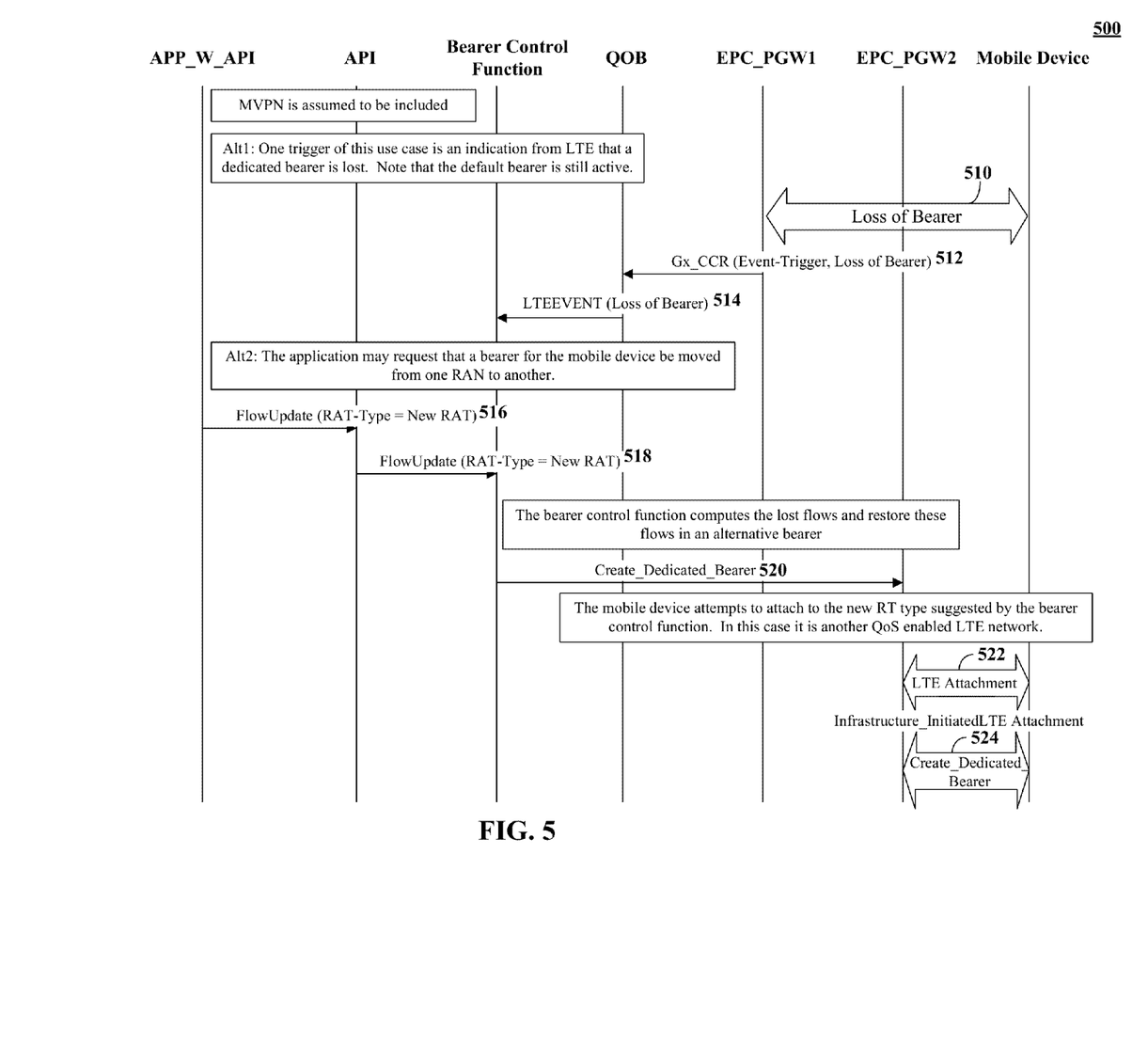
FIG. 5 is a time flow illustrating detecting abnormal bearer termination and dynamically restoring flows in accordance with an embodiment of the inventive arrangements disclosed herein.

FIG. 5 is a time flow illustrating detecting abnormal bearer termination and dynamically restoring flows in accordance with an embodiment of the inventive arrangements disclosed herein.

Flow 500 illustrates a generalized sequence diagram for LTE-to-LTE bearer rescue. It should be noted that the LTE-to-3G flow can be similar, however, the recovered-to network attach and bearer establishment would be replaced with similar procedures associated with 3G technology. An MVPN is assumed to be included in one embodiment. In one embodiment, a trigger for the use can be any event that indicates that a dedicated bearer is lost. The indicator can come from a node of the mobile communication network. When the dedicated bearer is lost, a default bearer can still be active.

Step 510 shows the loss of bearer can occur. This can be detected by a network element, such as by a Gx function of an LTE core, as shown by step 512. An LTE event indicating the loss of bearer can be conveyed to a bearer control function, as shown by step 514. Alternatively, an application can request that a bearer for the mobile device be moved from one network node (e.g., RAN) to another. That is, the embodiments of the disclosure can move flows of a lost bearer regardless of how the bearer loss is detected.

In step 516 and 518, a flow update messages can be conveyed, which move a lost flow to a restored flow on another RAN. A bearer control function, receiving the message 518 can compute a set of one or more lost flows and an alternative bearer to which the lost flows are to be restored. In step 520, a new bearer can be optionally created for the restored flows. Otherwise, restored flows can be added to a set of one or more existing bearers. The mobile device can attempt to attach the new RAT type suggested by the bearer control function. An LTE attachment action can occur in step 522. A new dedicated bearer can be created in step 524.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for restoring bearers and flows within a communication network comprising:
    establishing a plurality of bearers between a mobile device and a plurality of radio access networks (RANs), wherein the plurality of bearers comprise a plurality of dedicated bearers;
    detecting an abnormal termination of a dedicated bearer of the plurality of dedicated bearers, referred to as a lost bearer, wherein the lost bearer is not a default bearer within a communication network, wherein the lost bearer includes one or more lost communication flows, wherein each of the lost communication flows is an information exchange between a network component and the mobile device;
    identifying an alternative radio access network (RAN) capable of communicating with the mobile device, wherein the RAN is not one used for the dedicated bearer that was abnormally terminated and wherein the alternative RAN is one of the plurality of RANs or is a new RAN;
    detecting or establishing at least one alternative bearer at the alternative RAN; and
    automatically and dynamically routing each of the lost communication flows to the at least one alternative bearer where moved lost communication flows are referred to as restored flows, wherein a one-to-one correspondence exists between lost communication flows and restored flows, wherein the moving occurs without interrupting communications and in a manner that requires no manual actions to be taken by a user of the mobile device, wherein the flow of a non-terminated bearer of the plurality of dedicated bearers, which non-terminated bearer is established at a different RAN than the RAN associated with the least one alternative bearer, remains at the different RAN and is not moved to the alternative RAN associated with the least one alternative bearer.

2. The method of claim 1, further comprising:
    determining bearer properties of the dedicated bearer that was terminated, wherein the alternative bearer has bearer properties ensuring no loss of quality as defined by the bearer properties of the lost bearer.

3. The method of claim 1, wherein the dedicated bearer is a bearer of a Long Term Evolution (LTE) network.

4. The method of claim 3, wherein the alternative RAN associated with the least one alternative bearer is not a node of the Long Term Evolution network.

5. The method of claim 1, and wherein the abnormal termination and the moving occurs while the default bearer remains active.

6. The method of claim 1, wherein the alternative bearer is a new bearer that was not established at a time that the abnormal termination was detected, wherein bearer properties of the new bearer are based on bearer properties of the lost bearer, wherein the new bearer is for a network different than that of the lost bearer.

7. The method of claim 1, wherein the alternative bearer is an existing bearer, wherein the lost communication flows are moved to the alternative bearer, which is a dedicated and not a default bearer with a network node different from a node of the lost bearer.

8. The method of claim 1, wherein the at least one alternative bearer comprises a plurality of different alternative bearers linked to different nodes, wherein at least one of the restored communication flows are added to each of the different alternative bearers.

9. The method of claim 1, further comprising:
    determining at least one property associated with the dedicated bearer, wherein the property is at least one of a Quality of Service attribute, a priority value, and a configuration parameter, wherein the alternative bearer has the at least one property at a level of the lost bearer or greater.

10. The method of claim 1, wherein the detecting of the abnormal termination is associated with a Gx event within a Long Term Evolution (LTE) core, it occurs by the mobile device reporting the abnormal termination over the default bearer, or occurs by an application server reporting the abnormal termination.

11. The method of claim 1, wherein automatically and dynamically routing each of the lost communication flows to the at least one alternative bearer comprises:
changing an application steering configuration for a mobile virtual private network (MVPN) by public safety interoperability gateway (PSIG) via an MVPN application programming interface (API).

12. The method of claim 1, further comprising:
executing a restoration profile responsive to the detecting of the abnormal termination, wherein the executing performs a preconfigured action to restore the at least one lost bearer and the lost communication flows.

13. The method of claim 1, wherein the method is performed by a mobile virtual private network application programming interface.

14. The method of claim 1, wherein the lost bearer is an evolved packet system (EPS) bearer.

15. A computer program product comprising a computer readable storage medium having computer usable program code embodied therewith, the computer usable program code comprising:
computer usable program code stored in a storage medium, if said computer usable program code is executed by a processor it is operable to establish a plurality of bearers between a mobile device and a plurality of radio access networks (RANs), wherein the plurality of bearers comprise a plurality of dedicated bearers;
computer usable program code stored in a storage medium, if said computer usable program code is executed by a processor it is operable to detect an abnormal termination of a dedicated bearer of the plurality of dedicated bearers, referred to as a lost bearer, wherein the lost bearer is not a default bearer within a communication network, wherein the lost bearer includes one or more lost communication flows, wherein each of the lost communication flows is an information exchange between a network component and the mobile device;
computer usable program code stored in a storage medium, if said computer usable program code is executed by a processor it is operable to identify an alternative radio access network (RAN) capable of communicating with the mobile device, wherein the alternative RAN is not one used for the dedicated bearer that was abnormally terminated and wherein the alternative RAN is one of the plurality of RANs or is a new RAN;
computer usable program code stored in a storage medium, if said computer usable program code is executed by a processor it is operable to detect or establish at least one alternative bearer at the alternative RAN; and
computer usable program code stored in a storage medium, if said computer usable program code is executed by a processor it is operable to automatically and dynamically route each of the lost communication flows to the at least one alternative bearer where moved lost communication flows are referred to as restored flows, wherein a one-to-one correspondence exists between lost communication flows and restored flows, wherein the moving occurs without interrupting communications and in a manner that requires no manual actions to be taken by a user of the mobile device, wherein the flow of a non-terminated bearer of the plurality of dedicated bearers, which non-terminated bearer is established at a different RAN than the RAN associated with the least one alternative bearer, remains at the different RAN and is not moved to the alternative RAN associated with the least one alternative bearer.

16. The computer program product of claim 15, further comprising:
computer usable program code stored in a storage medium, if said computer usable program code is executed by a processor it is operable to determine bearer properties of the dedicated bearer that was terminated, wherein the alternative bearer has bearer properties ensuring no loss of quality as defined by the bearer properties of the lost bearer.

* * * * *